(12) United States Patent
Anderson et al.

(10) Patent No.: US 8,914,344 B1
(45) Date of Patent: Dec. 16, 2014

(54) SERVICE MANAGER SOURCE CODE CONTROL SYSTEM

(71) Applicant: Sprint Communications Company L.P., Overland Park, KS (US)

(72) Inventors: David L. Anderson, Belton, MO (US); David U. Crosby, Shawnee, KS (US); Dennis Donnelly, Overland Park, KS (US); Clinton W. Fountain, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 91 days.

(21) Appl. No.: 13/630,801

(22) Filed: Sep. 28, 2012

(51) Int. Cl.
*G06F 17/30* (2006.01)

(52) U.S. Cl.
USPC .......................................................... 707/704

(58) Field of Classification Search
USPC .......................................................... 707/704
See application file for complete search history.

(56) References Cited

U.S. PATENT DOCUMENTS

| | | | | |
|---|---|---|---|---|
| 5,835,769 | A * | 11/1998 | Jervis et al. | 717/113 |
| 6,487,713 | B1 * | 11/2002 | Cohen et al. | 717/105 |
| 7,596,782 | B2 * | 9/2009 | Ebbo et al. | 717/141 |
| 7,765,230 | B2 * | 7/2010 | Heinz et al. | 707/781 |
| 8,230,515 | B1 * | 7/2012 | Brewton et al. | 726/27 |
| 8,336,023 | B2 * | 12/2012 | Kuzsma et al. | 717/105 |
| 8,352,919 | B2 * | 1/2013 | Misch et al. | 717/126 |
| 8,583,769 | B1 * | 11/2013 | Peters et al. | 709/221 |
| 8,589,426 | B1 * | 11/2013 | Miles | 707/758 |
| 2003/0233564 | A1 * | 12/2003 | LaRose et al. | 713/193 |
| 2005/0102612 | A1 * | 5/2005 | Allan et al. | 715/513 |
| 2005/0114771 | A1 * | 5/2005 | Piehler et al. | 715/536 |
| 2006/0015844 | A1 * | 1/2006 | Johnson et al. | 717/106 |
| 2006/0101443 | A1 * | 5/2006 | Nasr | 717/163 |
| 2007/0006202 | A1 * | 1/2007 | Mikkelsen et al. | 717/163 |
| 2007/0130146 | A1 * | 6/2007 | Heinz et al. | 707/9 |
| 2008/0215983 | A1 * | 9/2008 | Wierowski et al. | 715/723 |
| 2011/0125798 | A1 * | 5/2011 | Misch et al. | 707/785 |
| 2013/0047139 | A1 * | 2/2013 | Bolton et al. | 717/121 |

* cited by examiner

*Primary Examiner* — Cam-Linh Nguyen (57) ABSTRACT

A method for controlling the user interfaces within a workflow manager to limit access to configuration and development files in the workflow manager is provided. The method comprises receiving from a user a request to edit a file in the workflow manager, wherein the file is one of a configuration file and a development file. The method also comprises determining whether the user has checked out the file. Additionally, the method comprises providing the user with an editor user interface to edit the file if the file is checked out to the user, wherein access to the files in the workflow manager is available only from within the workflow manager itself, wherein the files are not lockable to inhibit access to the files, wherein the file is available to be checked out to only one user at a time, and wherein the user interfaces in the workflow manager are configurable.

20 Claims, 7 Drawing Sheets

SERVICE MANAGER SOURCE CODE CONTROL SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A workflow manager is an application that manages and executes modeled computer processes. A workflow manager may interpret events, such as documents submitted to a server or due dates expiring, and act on them according to defined rules. The actions may be anything from saving the document in a document management system to issuing new work by sending an e-mail to users or escalating overdue work items to management. A workflow manager facilitates the flow of information, tasks, and events. A workflow manager may also provide a trouble ticket management system. Trouble tickets may be used to create, update, and resolve reported customer or employee issues with some aspect (e.g., information technology (IT) issues) of the organization.

SUMMARY

In an embodiment, a method for controlling the user interfaces within a workflow manager to limit access to configuration and development files in the workflow manager is provided. The method comprises receiving from a user a request to edit a file in the workflow manager, wherein the file is one of a configuration file and a development file. The method also comprises determining whether the user has checked out the file. Additionally, the method comprises providing the user with an editor user interface to edit the file if the file is checked out to the user and refraining from providing the user with the editor user interface if the file is not checked out to the user, wherein access to the files in the workflow manager is available only from within the workflow manager itself through the editor user interface, wherein the files are not lockable to inhibit access to the files, wherein the file is available to be checked out to only one user at a time, and wherein the user interfaces in the workflow manager are configurable.

In an embodiment, a system for controlling the user interfaces of a workflow manager to manage access to configuration and development files within the workflow manager is provided. The system comprises a user interface configured to display information to a user and to receive input from a user. The system also comprises a records file comprising a storage component, wherein the records file comprises entries for a plurality of configuration files and development files, wherein the entries comprise information about whether the corresponding file is checked out, the identity of a user to which the file is checked out when the file is checked out, and a history of changes made to the file. The system also comprises a display controller comprising a processor, wherein the display controller is configured to control information displayed on the user interface and to control selectable inputs available to the user on the user interface, wherein the display controller is further configured to instruct the user interface to present a display allowing read only mode for one of the configuration files and the development files when the one of the configuration files and the development files is not checked out to a requesting user, and wherein the display controller is further configured to instruct the user interface to provide a display allowing editing the one of the configuration files and the development files when after consulting the records file it is determined that the one of the configuration files and the development files is checked out by the requesting user.

In an embodiment, a method for managing configuration files and development files in a workflow manager is provided. The method comprises providing a user with a default user interface to access the configuration files and the development files, wherein access to the configuration files and the development files is limited to read only. The method also comprises receiving a request from the user to checkout one of the configuration files and the development files. The method further comprises providing the user with an editing mode user interface allowing the user to open the one of the configuration files and the development files in write mode if the one of the configuration files and the development files is not checked out to another user, wherein access to the configuration files and the development files is provided only through interfaces provided by the workflow manager.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Many workflow managers provided by a third party to an organization to support the organization's enterprise contain many customizable features. The third party workflow manager may provide the organization with the ability to write and manipulate code in order to customize the features to suit the organization. However, oftentimes these third party workflow managers to do not provide the organization with the ability to save multiple versions of changes to the third party workflow manager or mechanisms to prevent two different people from simultaneously making changes to the same portion of the code. For example, application customization may be performed by editing numerous system administration files inside of the application. A third party workflow manager may provide no version control, no access control, and no record of who edited which file or for what reason. Furthermore, multiple developers often overwrite each other's changes making for unstable source code control and introducing functionality bugs. Because a user may only be able to access the source code files from inside of a third party workflow manager itself, it may be difficult to use external source code control software to manage the code.

The present disclosure provides a source code control system within a workflow manager. The disclosed methods, systems, and apparatuses control file access and ensure that only one developer may edit a file at a single time. In an embodiment, the disclosed system may utilize functionality built in to the workflow manager (normally accessed manually) to automatically create backup copies of the files upon checkout of the records by a developer. The disclosed system may facilitate a planned release process by automatically creating export files to migrate bundled code changes to other servers.

In an embodiment, access to configuration and development files is provided solely through a user interface provided by the workflow manager. The display controller may be modified to provide a defacto locking function for configuration and development files that are not otherwise lockable by the workflow manager. The defacto locking function may be implemented by enforcing a set of rules designed to limit the elements that are displayed to and the functions that may be selected by a user in the user interface. By limiting the user interfaces provided to a user such that only one user may be presented with a user interface allowing editing of a configuration or development file, the configuration and development files may be "locked" by a user thereby preventing other users from simultaneously editing the configuration or development file.

In an embodiment, a display controller that controls what features are displayed to a user may be configured to consult a configuration and development record to determine a status of a record before presenting a user with a user interface that allows for editing or modifying a configuration or development file. In an embodiment, a user may be required to check out a configuration or development file before a screen is displayed that provides the user with an option to open a configuration or development file in write mode. Upon checking out a file, the configuration and development record entry for the requested file is changed to indicate which user has checked out the file. In an embodiment, when a user attempts to open a configuration or development file in write mode, the display controller may consult a configuration and development record to determine whether the requested file has been checked out by the requesting user. If the requested file has been checked out by the requesting user, then the display allowing the user to open the requested file in write mode is presented to the user. If the user has not checked out the requested file, then the option to open the requested file in write mode is prohibited. In an embodiment, the option to open the requested file in write mode may be displayed but not selectable.

In an embodiment, all configuration/development record types may be placed under version control and may be locked by default. The configuration/development record types may only be displayed in read-only mode. A developer may gain write access to a record only after performing a checkout of the record. After editing a file, the status may be changed to indicate that the file is ready for release.

Checkout records that are in a status that is ready for release may be bundled and exported to a different workflow manager development or production platform for implementation. These export records may be packaged by release date allowing all changes for a planned release to be migrated in a single action.

The checkout records may serve as a historical change record and may have robust search functionality. In an embodiment, records may be searched by any number of attributes such as developer, file name, status, release date, checkout date, etc.

Some of the advantages of the disclosed systems, methods, and apparatuses may include one or more of the following. In an embodiment, source code control may be added to the workflow manager configuration files and code libraries. In an embodiment, the disclosed systems, methods, and apparatuses may facilitate code migration and packaged releases. In an embodiment, detailed historical records of file changes may be created and maintained. In an embodiment, upon developer checkout, the system may automatically create backups which may be used to roll back changes as needed. In an embodiment, the disclosed systems, methods, and apparatuses may eliminate or reduce file corruption by preventing or inhibiting multiple developers from editing files substantially simultaneously, thereby reducing system bugs.

Figure 1:
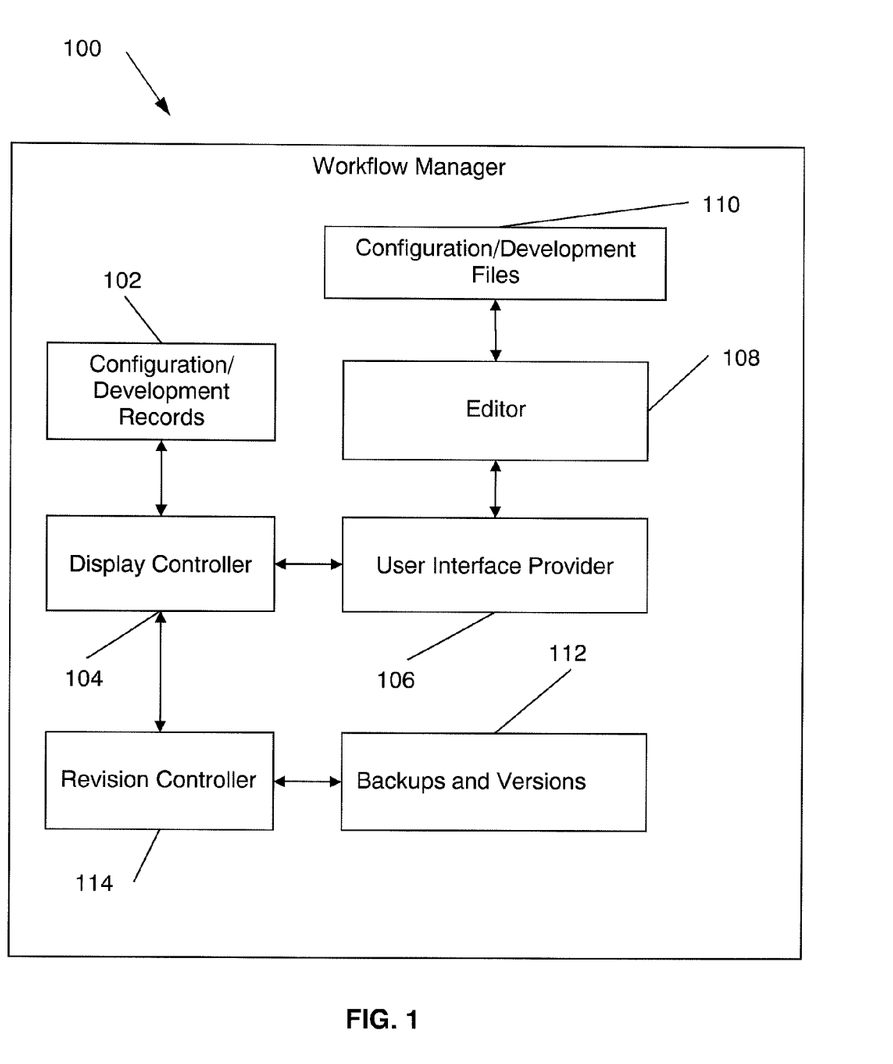
FIG. 1 is a block diagram of a workflow manager in accordance with an embodiment.

Turning now to FIG. 1, a block diagram of a workflow manager 100 is depicted in accordance with an embodiment. Workflow manager 100 may comprise a plurality of configuration/development files 110, a configuration/development record 102, a display controller 104, a user interface provider 106, and an editor 108, backups and versions storage 112, and a revision controller 114. Workflow manager 100 may execute on a general purpose computer such as described in more detail below and may be accessed by a user through a network. Workflow manager 100 may comprise other components not depicted such as, for example, a problem ticket management system. Some of the configuration/development files 110 may comprise code and/or other data that may be referenced by routines within the workflow manager 100 to perform one or more specific functions. An attribute may be passed from a calling routine of the workflow manager 100 to one of the configuration/development files 110 which may then perform some function and pass an attribute back to the calling routine. In an embodiment, the code in the configuration/development files 110 may be source and/or object code. The code and/or other data within one of the configuration/development files 110 may be edited by a user. Access to the configuration/development files 110 may be restricted to the user interface provider 106 provided by the workflow manager 100.

Display controller 104 enforces policies designed to prevent multiple users from editing the same configuration/development files or code simultaneously. Display controller 104 may be customizable by a user. Display controller 104 may consult configuration/development record 102 when a user requests to check out or edit one of the configuration/development files 110. The default mode for displaying configuration/development files 110 to a user may be set to read only. A user may request to check out one or more of the configuration/development files 110 through user interface provider 106.

When a user requests to check out one or more of the configuration/development files 110, the display controller 104 may consult the corresponding entry in configuration/development records 102 to determine whether another user has checked out the requested configuration/development file(s) 110. If another user has the requested configuration/development file(s) 110 checked out, then the display controller 104 may instruct the user interface provider 106 to present the user with a message indicating that the file is not available to be checked out. The message may indicate the identity of the user that currently has the requested configuration/development file(s) 110 checked out as well as an estimated time that the requested configuration/development file(s) 110 will be returned and checked in. If no other user has the requested configuration/development file(s) 110 checked out, then the display controller 104 may modify the corresponding entry/entries in configuration/development records 102 to indicate that the requested configuration/development file(s) 110 is checked out by the user. The display controller 104 may instruct the user interface provider 106 to present the user with a display allowing for write access (i.e., allow the user to edit the requested configuration/development file(s) 110 and save the changes) to the requested configuration/development file(s) 110 and may open an editor 108 to facilitate editing the requested configuration/development file(s) 110.

When the requested configuration/development file(s) 110 is checked out, the display controller 104 may instruct the revision controller 114 to create a backup of the requested configuration/development file(s) 110 and save it in backups and versions storage 112. The saved backup may comprise a version number. The display controller may edit the configuration/development records 102 to indicate that a new version has been created and the location of the new version.

When the user has finished editing the requested configuration/development file(s) 110 with editor 108, the user may check the requested configuration/development file(s) 110 back in through user interface provider 106. The edited configuration/development file(s) 110 may be saved. The display controller 104 may edit the configuration/development records 102 to indicate that the requested configuration/development file(s) 110 are not checked out.

Upon check in, the display controller may instruct the user interface provider 106 to provide the user with an interface to describe the changes made, the purpose for the changes, and any comments that the user may have. The display controller 104 may edit the configuration/development records 102 to save the user's description of the changes, purpose for the changes, and comments. The display controller 104 may also indicate a version number associated with the changed the requested configuration/development file(s) 110 as well as a time/date stamp for the version.

In an embodiment, the display controller 104 may instruct the user interface provider 106 to provide a user with means to open and edit a backup or old version of one of the configuration/development files stored in backups and versions storage 112. If the user opens and edits an old version of a configuration/development file with the editor 108, the user may be allowed to save the edits to the old version of a configuration/development file to configuration/development files 102. However, to do so, the user may be required to check out the current version of the configuration/development file.

Once the current version of the configuration/development file is checked out and opened, the display controller 104 may instruct the revision controller to save a copy of the current version to backups and versions storage 112. The user may then copy changes from the old version to the current version in editor 108 and save the changes to configuration/development files 110. A user may wish to do so if changes to the current version caused a problem.

In an embodiment, display controller 104 may instruct revision controller 114 to bundle and export checkout records from backups and versions storage 112 that are in a status that is ready for release as determined from configuration/development records 102 to a different workflow manager development or production platform for implementation when requested by a user through user interface provider 106. These export records may be packaged by release date allowing all changes for a planned release to be migrated in a single action. The display controller may also create an export file from one of the configuration/development files to migrate a bundled code change to a another server. The backups and versions storage 112 may be searchable by any number of attributes including version number, release date, status, checkout date, user or developer identification, file name, etc. User interface provider 106 may provide an interface to allow searching of the backups and versions storage 112 as well of configuration/development records 102.

Figure 2:
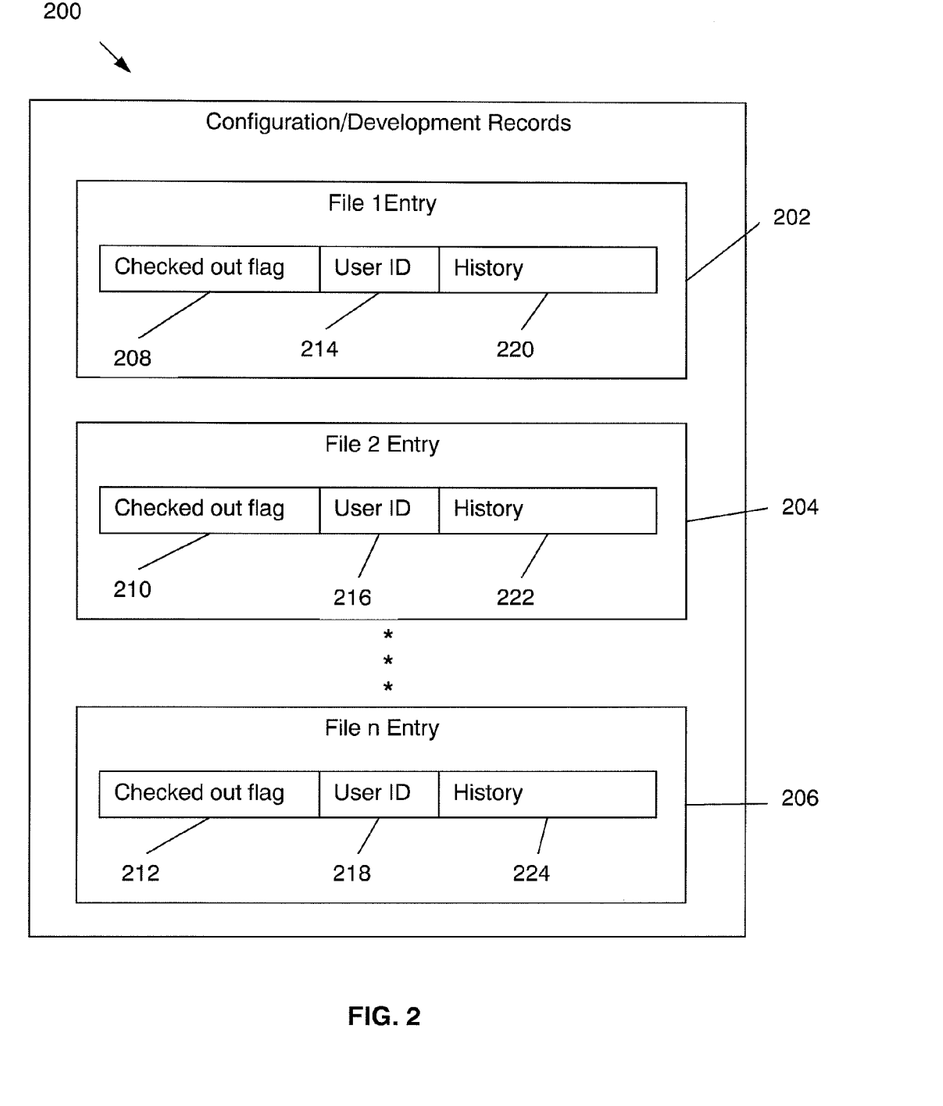
FIG. 2 is a block diagram of configuration/development records in accordance with an embodiment.

Turning now to FIG. 2, a block diagram of configuration/development record 200 in accordance with an embodiment is described. Configuration/development record 200 may be implemented as configuration/development records 102 shown in FIG. 1. Configuration/development record 200 may comprise a plurality of entries 202, 204, 206 corresponding to file 1, file 2, and file n. Each entry 202, 204, 206 may comprise a checked out flag 208, 210, 212, a user identification (ID) 214, 216, 218, and a history 220, 222, 224. The checked out flag 208, 210, 212 may indicate whether the corresponding file has been checked out. The user ID 214, 216, 218 may be populated with information that indicates the identity of a user that has checked out a corresponding file. If the file has not been checked out, then the user ID 214, 216, 218 may not be populated. The history section 220, 222, 224 of the entry 202, 204, 206 may comprise information about the dates and times of changes to the corresponding configuration/development file as well as other historical information. In an embodiment, the history section 220, 222, 224 may comprise a description of the changes associated with each version of the corresponding configuration/development file, a description of the reason for the changes, an identification of the user that made the changes, any comments that the user that made the changes may have, a version number for each change, and an indication of where a copy of each version may be located. History section 220, 222, 224 may comprise other information as well. The entries 202, 204, 206 may be edited by a display controller 104 to keep the information in the configuration/development record 200 current.

Figure 3:
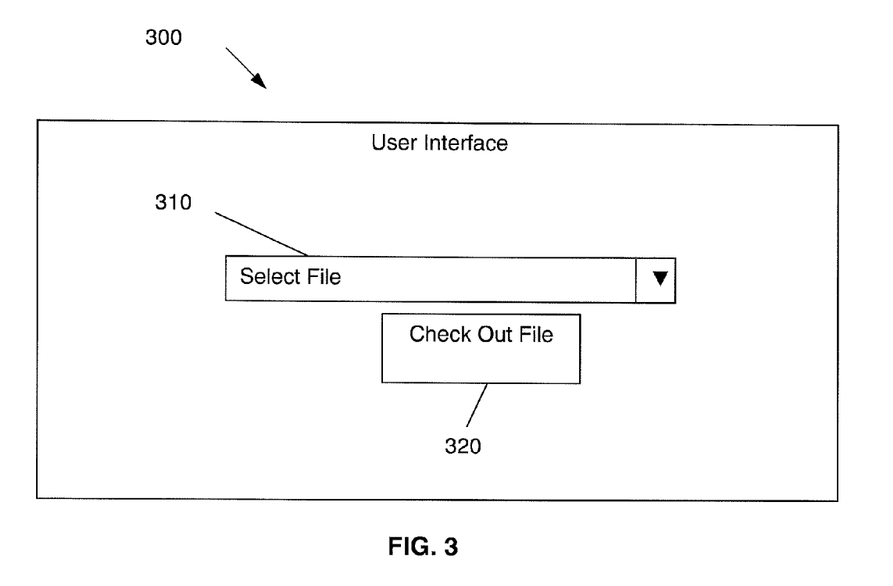
FIG. 3 is an illustration of a user interface for checking out a configuration or development file in accordance with an embodiment.

FIG. 3 is an illustration of a user interface 300 for checking out a configuration or development file in accordance with an embodiment. User interface 300 may comprise a select file field 310 and a check out file button 320. A user may select a configuration or development file using the select file field 310 and then may select check out file button 320 to check out the selected configuration or development file. User interface 300 is an example of a user interface that may be provided to the user by user interface provider 106.

Figure 4:
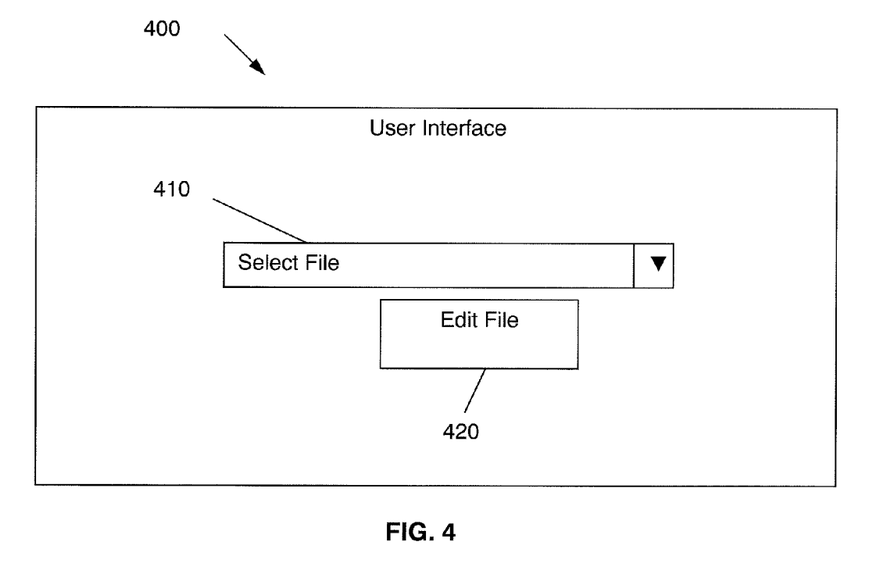
FIG. 4 is an illustration of a user interface for requesting to edit a configuration or development file in accordance with an embodiment.

FIG. 4 is an illustration of a user interface 400 for requesting to edit a configuration or development file in accordance with an embodiment. User interface 400 is an example of a user interface that may be provided by user interface provider 400 in FIG. 1. User interface 400 may comprise a select file field 410 and an edit file button 420. The select file field 410 may allow the user to select a configuration or development file to edit. The options in the select file field 410 may be limited to files that have been checked out by the user thereby preventing a configuration or development file from being edited by two different users or developers at the same time. Upon selection of the desired file in select file field 410, the user may select the edit file button 420 to open and begin editing the requested file.

Figure 5:
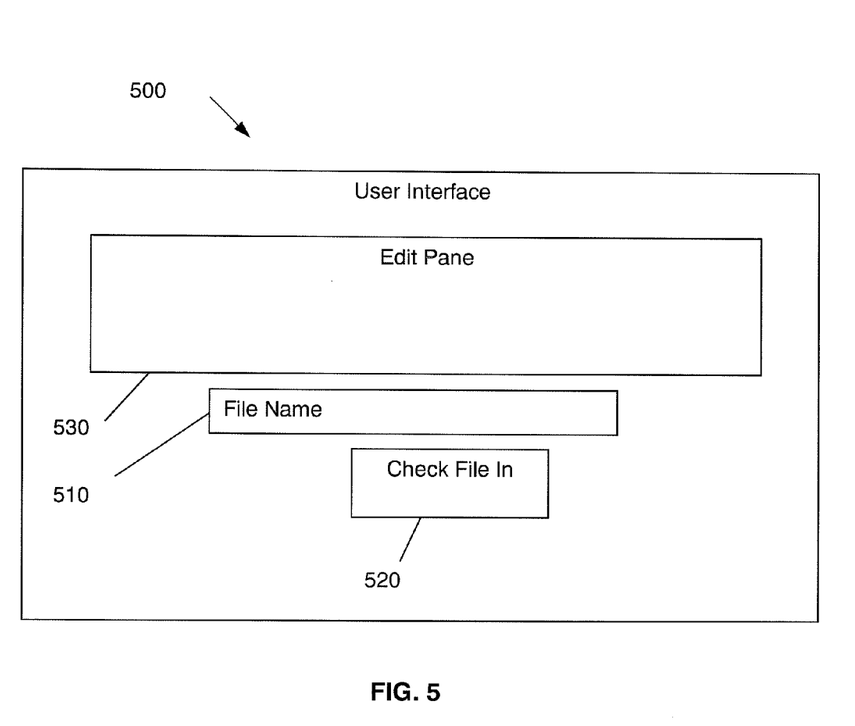
FIG. 5 is an illustration of a user interface for editing a file and checking in the file in accordance with an embodiment.

FIG. 5 is an illustration of a user interface 500 for editing a file and checking in the file in accordance with an embodiment. User interface 500 is an example of a user interface that may be provided by user interface provider 106 in FIG. 1. User interface 500 may provide an edit pane 530, a file name field 510, and a check file in button 520. Edit pane 530 may allow a user to edit the contents of a file. File name field 510 may provide a field for the user to specify the name of the file. The contents of the file name field 510 may be populated automatically based on the name of the file being edited. Check file in button 520 provides the user with a selectable button which the user may select when the user is finished editing the file and wishes to save the file and check in the edits.

Figure 6:
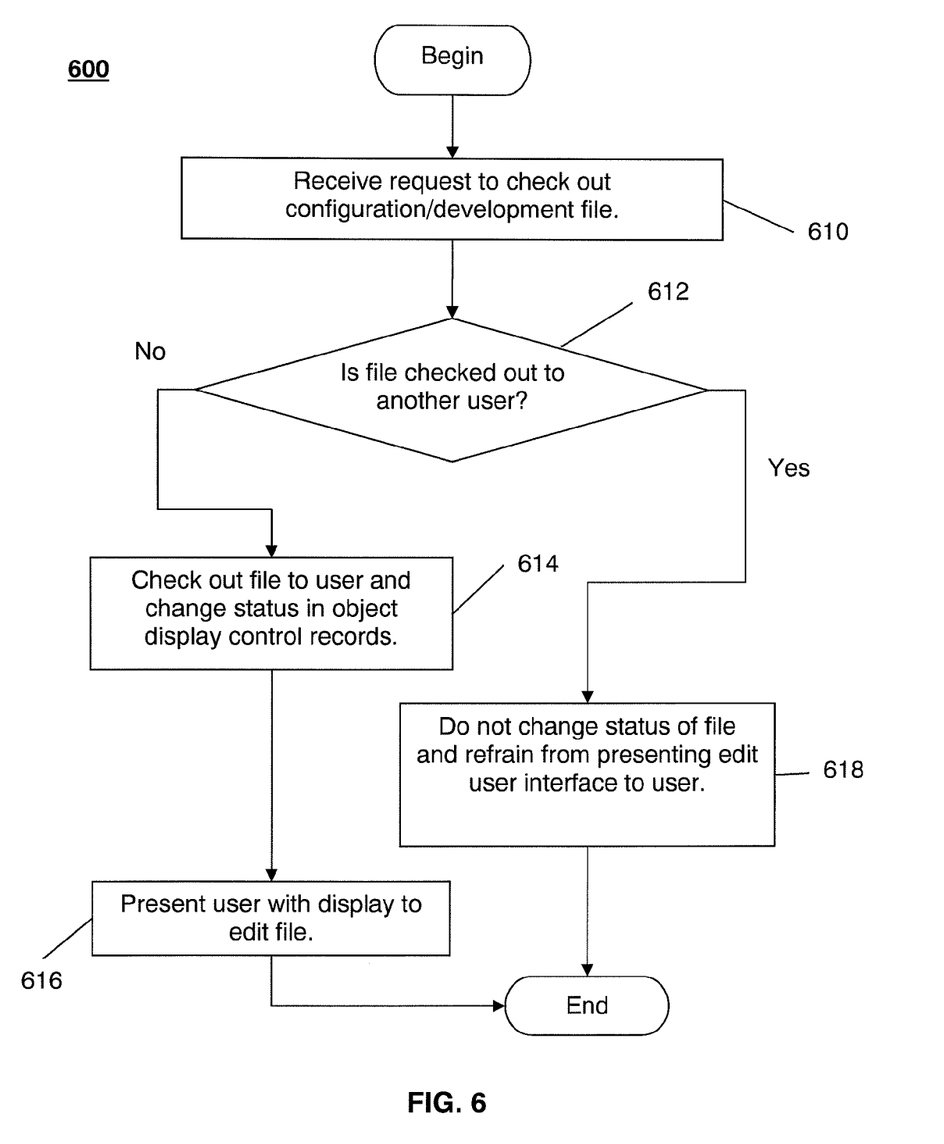
FIG. 6 is a flowchart of a method for checking out a configuration/development file according to an embodiment.

FIG. 6 is a flowchart of a method 600 for checking out a configuration/development file according to an embodiment. The method 600 may be implemented by workflow manager 100 in FIG. 1. The method 600 may begin at step 610 where the workflow manager 100 may receive a request to check out a configuration/development file through a user interface provided by the workflow manager 100. At step 612, the method 600 determines whether the file is checked out to another user. The method 600 may also determine whether the user is authorized to check out the file if editing privileges are limited to select users. If the file is not checked out to another user, then the method 600 proceeds to step 614 where the file is checked out to the user and the status of the file is changed in the configuration/development records to indicate that the file is checked out and to indicate the identity of the user that has checked the file out. The method 600 may proceed to step 616 where the user is presented with a display enabling the user to edit the file, after which, the method 600 may end. If, at step 612, the method 600 determines that another user has the file checked out, then the method 600 may proceed to step 618 where the method 600 refrains from changing the status of the file and refrains from presenting to the user the user interface that provides for editing of the file, after which the method 600 may end. The workflow manager 100 may present the user with an indication that another user has the file checked out and, in an embodiment, may indicate the identity of the other user. In an embodiment, the workflow manager 100 may indicate the expected time by which the other user who has checked out the file expects to check in the file.

Figure 7:
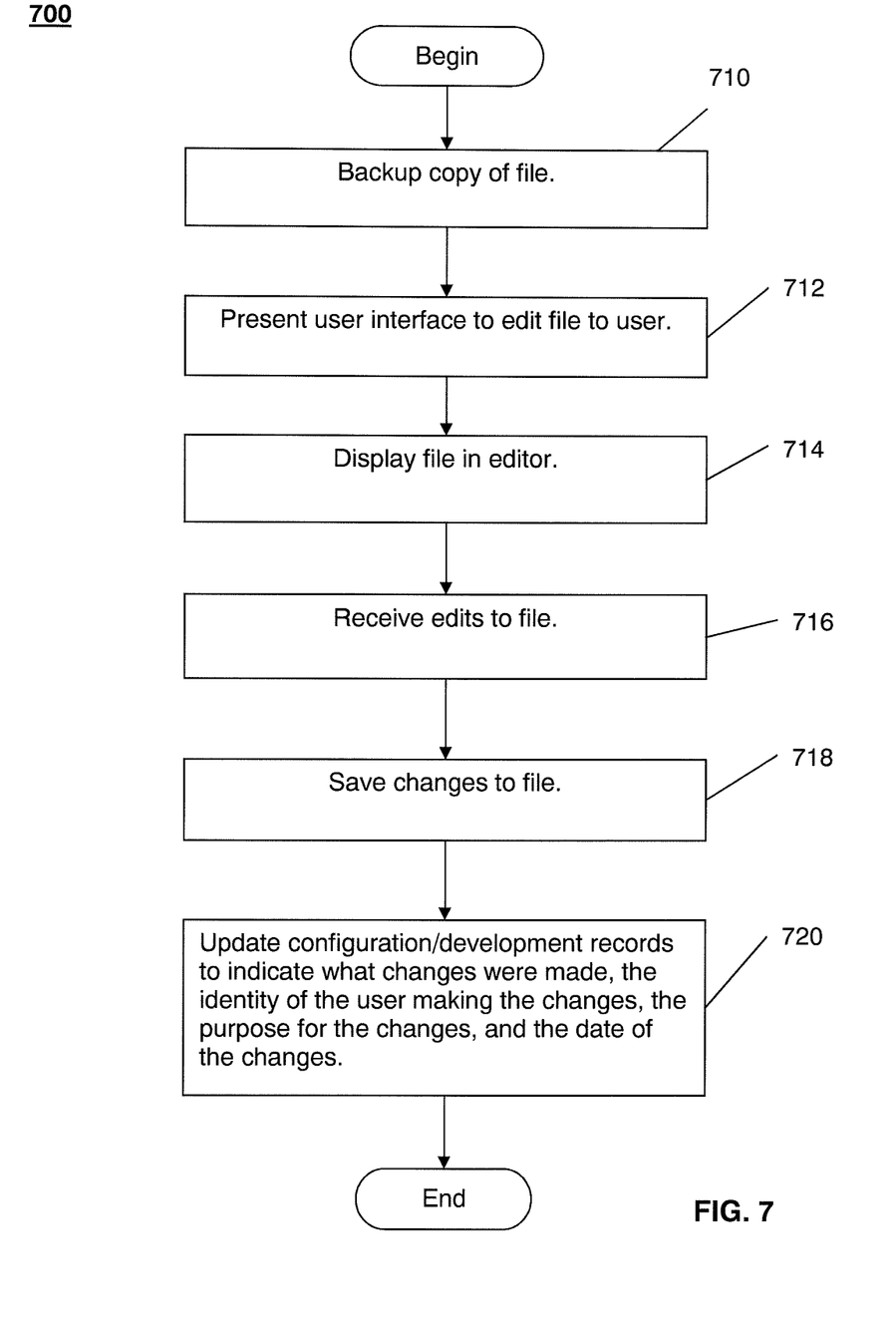
FIG. 7 is a flowchart of a method of editing a configuration/development record according to an embodiment.

FIG. 7 is a flowchart of a method 700 of editing a configuration/development record according to an embodiment. The method 700 may be implemented by workflow manager 100 in FIG. 1. The method may begin at step 710, where a backup copy of the configuration/development file requested by the user is created and stored in the backups and versions storage 112 in the workflow manager 100 after it has been determined that the file has been checked out by the user. At step 712, the user is presented with a user interface to edit the file. At step 714, the file may be displayed in an editor allowing the user to change the file. At step 716, edits to the file may be received and, at step 718, the changed file may be saved. At step 720, the configuration/development records may be updated to indicate what changes were made to the file, the identity of the user making the changes, the purpose for the changes, and the date of the changes. The configuration/development records may also be updated to indicate the version of the changed file. Any comments or documentation notes that the user may have may be entered and stored in the configuration/development records as well. In an embodiment, other data related to the changes to the file may be stored in configuration/development records. After step 720, the method 700 may end.

Figure 8:
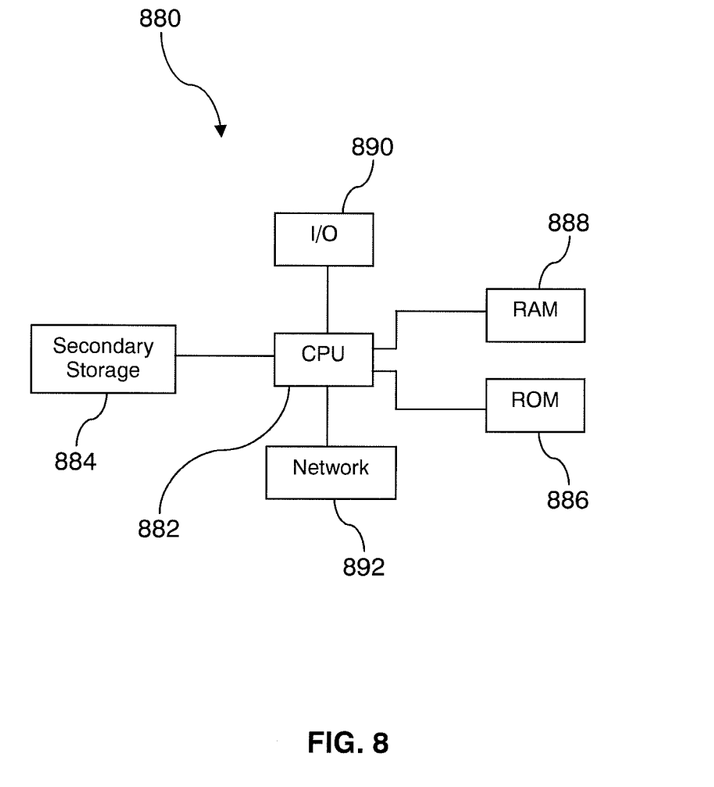
FIG. 8 illustrates an exemplary computer system suitable for implementing some aspects of the several embodiments of the disclosure.

FIG. 8 illustrates a computer system 880 suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor 882 may be implemented as one or more CPU chips.

It is understood that by programming and/or loading executable instructions onto the computer system 880, at least one of the CPU 882, the RAM 888, and the ROM 886 are changed, transforming the computer system 880 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage 884. The RAM 888 is used to store volatile data and perhaps to store instructions. Access to both ROM 886 and RAM 888 is typically faster than to secondary storage 884. The secondary storage 884, the RAM 888, and/or the ROM 886 may be referred to in some contexts as computer readable storage media and/or non-transitory computer readable media.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 892 may enable the processor 882 to communicate with the Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 884, for example, hard drives, floppy disks, optical disks, and/or other device, the ROM 886, and/or the RAM 888 may be referred to in some contexts as non-transitory instructions and/or non-transitory information.

In an embodiment, the computer system 880 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 880 to provide the functionality of a number of servers that is not directly bound to the number of computers in the computer system 880. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 880, at least portions of the contents of the computer program product to the secondary storage 884, to the ROM 886, to the RAM 888, and/or to other non-volatile memory and volatile memory of the computer system 880. The processor 882 may process the executable instructions and/or data structures in part by directly accessing the computer program product, for example by reading from a CD-ROM disk inserted into a disk drive peripheral of the computer system 880. Alternatively, the processor 882 may process the executable instructions and/or data structures by remotely accessing the computer program product, for example by downloading the executable instructions and/or data structures from a remote server through the network connectivity devices 892. The computer program product may comprise instructions that promote the loading and/or copying of data, data structures, files, and/or executable instructions to the secondary storage 884, to the ROM 886, to the RAM 888, and/or to other non-volatile memory and volatile memory of the computer system 880.

In some contexts, the secondary storage 884, the ROM 886, and the RAM 888 may be referred to as a non-transitory computer readable medium or a computer readable storage media. A dynamic RAM embodiment of the RAM 888, likewise, may be referred to as a non-transitory computer readable medium in that while the dynamic RAM receives electrical power and is operated in accordance with its design, for example during a period of time during which the computer 880 is turned on and operational, the dynamic RAM stores information that is written to it. Similarly, the processor 882 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for controlling the user interfaces within a workflow manager to limit access to configuration and development files in the workflow manager, comprising:
   receiving from a user a request to edit a configuration or development file in the workflow manager, wherein the configuration or development file is available to be checked out to only one user at a time, and wherein the configuration or development file is not lockable by the workflow manager to inhibit access to the configuration or development file by more than one user at a time;
   determining whether the user has checked out the configuration or development file;
   in response to determining that the configuration or development file is checked out to the user, providing the user with an editor user interface to edit the configuration or development file, wherein access to edit the configuration or development file in the workflow manager is available only from within the workflow manager itself through the editor user interface; and
   in response to determining that the file is checked out to another user, providing the user with a different user interface to prevent the user from editing the configuration or development file, wherein the different user interface presents a display allowing read only mode for the configuration or development file.

2. The method of claim 1, further comprising presenting a display to the user indicating that the configuration or development file is not available to be edited when the user has not checked out the file, wherein a default mode for displaying the configuration or development file to any user is read only.

3. The method of claim 1, further comprising creating a backup of the configuration or development file and saving the backup of the configuration or development file before providing the user with the editor user interface to edit the configuration or development file.

4. The method of claim 1, further comprising modifying a configuration/development record to indicate at least one of the changes made to the configuration or development file, an identity of the user that made the changes, a reason for the changes, and a version number.

5. The method of claim 1, further comprising modifying a configuration/development record to indicate the changes made to the configuration or development file, an identity of the user that made the changes, a reason for the changes, and a version number.

6. The method of claim 1, further comprising creating an export file from the configuration or development file to migrate a bundled code change to a server.

7. The method of claim 1, further comprising modifying a configuration/development record to indicate that the configuration or development file has been released by the user and is available to be checked out by another user.

8. The method of claim 1, wherein the editor user interface comprises an option to open the configuration or development file in write mode, and wherein the different user interface prohibits selection of the option to open the configuration or development file in write mode.

9. A system for controlling the user interfaces of a workflow manager to manage access to configuration and development files within the workflow manager, comprising:
   a user interface configured to display information to a user and to receive input from the user;
   a records file comprising a storage component, wherein the records file comprises entries for a plurality of configuration files and development files, wherein the entries comprise information about whether the corresponding file is checked out, the identity of an editing user to which the file is checked out when the file is checked out, and a history of changes made to the file; and
   a display controller of the workflow manager comprising a processor, wherein the display controller is configured to:
      provide an editor user interface allowing editing of one of the configuration files and the development files when, after consulting the records file, it is determined that the one of the configuration files and the development files is checked out by a requesting user, wherein the one of the configuration files or development files is available to be checked out to only one user at a time, and wherein the one of configuration files and the development files is not lockable by the workflow manager to inhibit access to the one of the configuration files and the development files by more than one user at a time, and
      provide a different user interface to prevent the user from editing the one of the configuration files and the development files when, after consulting the records file, the one of the configuration files and the development files is checked out by another user other than the requesting user, wherein the different user interface presents a display allowing read only mode for the one of the configuration files and development files.

10. The system of claim 9, further comprising a backups and versions storage comprising a plurality of versions of the one of the configuration files and the development files.

11. The system of claim 9, wherein the display controller is further configured to change the status of the entry for the one of the configuration files and the development files in the records file to indicate that the one of the configuration files and the development files is checked out to the requesting user when a request to check out the one of the configuration files and the development files is received by the user interface and the one of the configuration files and the development files is not checked out to another user.

12. The system of claim 9, wherein the display controller is further configured to create a backup of the one of the configuration files and the development files before instructing the user interface to provide the requesting user with a user interface allowing editing of the one of the configuration files and the development files.

13. The system of claim 9, wherein the display controller is further configured to change the status of the entry in the records file for the one of the configuration files and the development files to be checked in when the requesting user checks in the edits to the one of the configuration files and the development files.

14. The system of claim 9, wherein the display controller is further configured to update the entry in the records file for the one of the configuration files and the development files to indicate the changes made to the one of the configuration files and the development files and to indicate the identity of the editing user making the changes.

15. The system of claim 9, wherein the display controller is further configured to update the entry in the records file for the one of the configuration files and the development files to indicate the identity of the requesting user making the changes.

16. The system of claim 9, wherein the display controller is further configured to bundle and export checkout records that are in a status that is ready for release to a different workflow manager development or production platform for implementation.

17. The system of claim 16, wherein the checkout records are packaged by release data allowing all changes for a planned release to be migrated in a single action.

18. A method for managing configuration files and development files in a workflow manager, comprising:

providing a user with a default user interface different from an editor user interface to access the configuration files and the development files, wherein access to the configuration files and the development files via the default user interface is limited to read only;

receiving a request from the user to checkout one of the configuration files and the development files, wherein the one of the configuration files and the development files is available to be checked out to only one user at a time, and wherein the one of the configuration files and the development files is not lockable by the workflow manager to inhibit access to the one of the configuration files and the development files by more than one user at a time; and in response to determining that the one of the configuration files and the development files is not checked out to another user, providing the user with the editor user interface allowing the user to open the one of the configuration files and the development files in write mode, wherein access to edit the one of the configuration files and the development files is available only from within the workflow manager itself through the editor user interface.

19. The method of claim 18, further comprising updating a records file to indicate that the one of the configuration files and the development files is checked out to the user.

20. The method of claim 18, further comprising creating and storing a backup of the one of the configuration files and the development files when the one of the configuration files and the development files is checked out.

* * * * *